United States Patent
Riess et al.

(10) Patent No.: US 6,942,084 B2
(45) Date of Patent: Sep. 13, 2005

(54) CLUTCH RELEASE MECHANISM FOR COMPENSATING FOR MISALIGNMENTS IN A FRICTION CLUTCH OF A MOTOR VEHICLE

(75) Inventors: Thomas Riess, Haßfurt (DE); Karl Müller, Poppenhausen (DE); Kurt Lindner, Niederwerrn (DE); Martin Geiger, Güntersleben (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/456,031

(22) Filed: Jun. 6, 2003

(65) Prior Publication Data

US 2003/0226735 A1 Dec. 11, 2003

(30) Foreign Application Priority Data

Jun. 7, 2002 (EP) .............................................. 02012685

(51) Int. Cl.⁷ .............................................. F16D 23/14
(52) U.S. Cl. ...................... 192/98; 192/110 B; 384/498; 384/612
(58) Field of Search ............................... 192/98, 110 B; 384/495, 498, 612

(56) References Cited

U.S. PATENT DOCUMENTS

| | | | |
|---|---|---|---|
| 3,631,954 A | | 1/1972 | Coaley |
| 3,882,979 A | * | 5/1975 | Limbacher et al. ............ 192/98 |
| 4,305,492 A | * | 12/1981 | Mori et al. ..................... 192/98 |
| 4,565,272 A | * | 1/1986 | Miyahara ...................... 192/98 |
| 4,708,230 A | | 11/1987 | Maucher |
| 4,739,867 A | * | 4/1988 | Harrington .................... 192/98 |
| 2002/0134641 A1 | * | 9/2002 | Klopfer et al. ................ 192/98 |

FOREIGN PATENT DOCUMENTS

| | | |
|---|---|---|
| DE | 199 12 431 A1 | 9/1999 |
| EP | 0 511 051 A1 | 10/1992 |
| FR | 2 514 448 | 10/1982 |

* cited by examiner

Primary Examiner—Rodney H. Bonck
(74) Attorney, Agent, or Firm—Cohen, Pontani, Lieberman & Pavane

(57) ABSTRACT

A release mechanism for actuating a friction clutch between an internal combustion engine and a transmission of a motor vehicle that is designed for concentric assembly on a guide sleeve mounted on a transmission shaft in order to bear against a release spring of the friction clutch where the guide sleeve and the friction clutch each having a respective center axis. The release mechanism includes a clutch release bearing. The release mechanism also includes a first device for compensating for at least one of a tilt between the center axes and wobbling eccentricity of the release spring where the first device includes a spherical surface between the release bearing and the guide sleeve, and a second device for compensating for offset between the center axes.

7 Claims, 3 Drawing Sheets

CLUTCH RELEASE MECHANISM FOR COMPENSATING FOR MISALIGNMENTS IN A FRICTION CLUTCH OF A MOTOR VEHICLE

BACKGROUND OF THE INVENTION

1. Field of the Invention

The invention pertains to a clutch release mechanism for actuating a friction clutch between an internal combustion engine and a transmission of a motor vehicle, this mechanism is being installed as concentric assembly around a guide sleeve mounted on a transmission shaft, including a release bearing with an inner ring, an outer ring, and a sliding sleeve, where one of the rings, preferably the inner ring, is in working connection with a release spring of the friction clutch and the outer ring is in working connection with the sliding sleeve, and where the assembled release mechanism compensates for a tilt of the center axis of the friction clutch with respect to the center axis of the guide sleeve and/or for a wobbling eccentricity of the release spring and also compensates for an offset between the previously mentioned center axes.

2. Description of the Related Art

A clutch release mechanism for a push-type friction clutch for a motor vehicle is disclosed in DE 199 12 431 A1 (equivalent to UK patent application GB 2 339 00). The mechanism includes a release bearing, which is mounted on a sliding sleeve, and a disk spring, which belongs to the friction clutch and is in working connection with the release bearing. Particularly, the disclosed mechanism includes two areas with complementary surfaces in the form of segments of a sphere which are provided between the disk spring and the release bearing. The two areas with the spherical segments are provided directly or indirectly on the disk spring; and the areas forming the spherical segments can be shifted radially toward the release bearing.

The areas of the spherical segments are slideable with respect to each other. The slideable surfaces, i.e. areas, are formed from a surface of the distal end of the tongues of the disk spring and a flange-like contact surface of a compensating ring that is in contact with the release bearing.

The complementary spherical segments act as a ball joint for one of the two elements forming part of the ball joint and can effectively compensate for a wobbling eccentricity, such as those caused by the clutch spring, i.e. disk spring, of a friction clutch. To do this, the previously mentioned compensating ring adjusts itself automatically to the position of the disk spring or of its tongues by swiveling in the ball joint under the pressure applied to the tongues. But if there is also a misalignment of the center axis of the friction clutch with respect to the center axis of the release mechanism, such as an offset between the two center axes, then it is not enough for the compensating ring "merely" to follow the path prescribed for it by the ball joint. Therefore, to prevent wear in the contact area between the compensating ring and the tongues, it would be necessary for the compensating ring to be capable of another type of eccentricity.

SUMMARY OF THE INVENTION

The present invention is a clutch release mechanism that has a first device for compensating for a tilt of the center axis of the friction clutch with respect to the center axis of the guide sleeve. This first device consists of two elements cooperating with each other on a common bearing surface between the release bearing and the guide sleeve. At least part of this bearing surface is spherical in shape. In addition, according to the present invention, the clutch release mechanism has a second device for compensating for an offset of the center axis of the friction clutch with respect to the center axis of the guide sleeve. This second device includes a sliding surface in a plane perpendicular to the center axis of the guide sleeve that is located between the release bearing and the sliding sleeve. There, a compensating ring, which is in working connection with the tongues of the clutch spring, or at least the release bearing itself, slidingly bears on this sliding surface with respect to the sliding sleeve within certain limits. Thus, the device moves out of its coaxial position with respect to the guide sleeve.

The two devices can be integrated into a clutch release mechanism, where, as a result of the contact between the rotating inner ring of the release bearing and the tongues of the clutch spring, the release bearing is able to accompany the movements of the spring as intended, for which reason the two devices must be installed between the release bearing and the guide sleeve.

The function of the first device is performed by a centering element, which is installed around the guide sleeve and which forms together with the sliding sleeve a common spherical bearing surface. In this case, the centering element has a convex spherical surface, whereas the sliding sleeve has a complementary concave spherical surface. It is not important for the radius of the spherical bearing surface to have its origin exactly on the center axis of the release guide sleeve, because the swiveling movements of the externally mounted sliding sleeve with respect to the centering element cover only a few angular degrees, which gives the design engineer the ability to adapt the spherical bearing surface appropriately to the concrete situation, namely, to the diameter and length of the sliding sleeve.

Additionally, making the sliding sleeve out of plastic offers the possibility of snapping the centering element, also made of plastic, into the position provided for this purpose in the sliding sleeve. The centering element either is snapped into the sliding sleeve with the help of elastic tongues or is seated as a slotted, open ring on the sliding sleeve. In any case, measures for facilitating the snapping-in procedure are taken either on the centering element or on the sliding sleeve so that the two parts can be connected to each other.

The sliding surface is in a plane perpendicular to the center axis of the guide sleeve and is on the outer ring of the release bearing, which may slide along the sliding surface of the sliding sleeve within certain limits. Thus, the release bearing is pushed out of a position coaxial with respect to the guide sleeve, where the elastic connection between the release bearing and the sliding sleeve produced by a clamp creates a certain amount of static friction. A ring-shaped stop is provided on the sliding surface of the sliding sleeve and/or on the spherical bearing surface to limit the deflection of the outer ring out of its centered position by coming into contact with one of the elements participating in the two devices.

In one embodiment of the present invention, a spherical bearing surface between the centering element and the sliding sleeve has a centering element, which is designed as a ring with a convex spherical surface on one side and has a sliding surface on the opposite side. The sliding surface is preferably on an inward radial extension of the outer ring of the release bearing, whereas the spherical surface on the opposite side of the centering element cooperates with the complementary concave spherical surface on a sliding sleeve to form the spherical bearing surface. The origin of the radius of this spherical surface is on the center axis of the guide sleeve, but the radius is many times greater than that of the previously described embodiment of the release mechanism. A stop, which is intended to prevent the elements which are sliding over each other from moving more than a predetermined distance from of their centered positions, is provided on the centering element and/or on the sliding sleeve. Therefore, the release bearing can move only a certain distance with respect to the centering element, with which it has a common center axis, and the centering element can slide only a certain distance with respect to the sliding sleeve, with which it also has a common center axis, upon which all the components are ideally centered when all of the components are perfectly aligned.

In accordance with one embodiment, a clutch release mechanism includes a centering element wherein a sliding surface is cooperating with a sliding sleeve. However, the stop having the previously described function is located on the sliding sleeve. On the side opposite the sliding surface, the centering element has a concave spherical surface, which interacts with a convex spherical surface on a ring having a profiled surface i.e. a flange. A stop prevents the ring from shifting with respect to the centering element. The flanged ring is connected to the outer ring of the release bearing and is preferably formed to it to facilitate assembly. The components of the release mechanism are pretensioned by a clamp. The pretension, however, still gives the ring a certain transverse mobility with respect to the centering element and the centering element a certain transverse mobility with respect to the sliding sleeve.

The curvature of the spherical bearing surface, may also be in the opposite direction from that described above and shown in the drawings. A ball joint is, therefore, obtained again, but, from the perspective of the inner ring of the release bearing, it offers a different kinematics, which is useful in certain cases, but does not offer the stability provided by the restoring force, which always tries to move the release bearing back into its centered position.

In one embodiment, the sliding sleeve reacts to a wobbling eccentricity of the tongues of the clutch spring by bearing on the guide sleeve. The inside diameter of the sliding sleeve has a convex spherical surface which is in contact at all times with the guide sleeve along a circumference of the bearing. At the end facing the release bearing, the sliding sleeve has the sliding surface with a stop. The outer ring of the release bearing is free to move and functions in the same way as in the other variants of the release mechanism.

In one embodiment of the present invention, the centering element is a ring with a sliding surface on one side and with a slanted surface on the other side, where the slanted surface is inclined at an angle which corresponds to the maximum wobbling eccentricity. The slanted surface cooperates with a complementary slanted surface on the end surface of a sliding sleeve, so that the sliding surface and, thus, the release bearing rotate without eccentricity in a first extreme position but rotate with eccentricity in the other extreme position, the amount of eccentricity corresponding to twice the slant angle. Whereas the centering element rotates and thus correctly adjusts itself to the eccentricity of the tongues of the release spring, the release bearing slides on the sliding surface when necessary to compensate for an offset between the center axis of the release bearing and the center axis of the sliding sleeve. There, as also in the previously described embodiment, a stop is provided in the area of the sliding surface to limit the movement of the release bearing with respect to the sliding sleeve.

It is an object of the present invention to provide a release mechanism for actuating a release spring of a friction clutch of a motor vehicle which, without taking up a great deal of space, includes a device for compensating for a tilt of the center axis of the friction clutch with respect to the center axis of a guide sleeve and/or a device for compensating for an offset between the previously mentioned center axes and/or for a wobbling eccentricity of the release spring.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
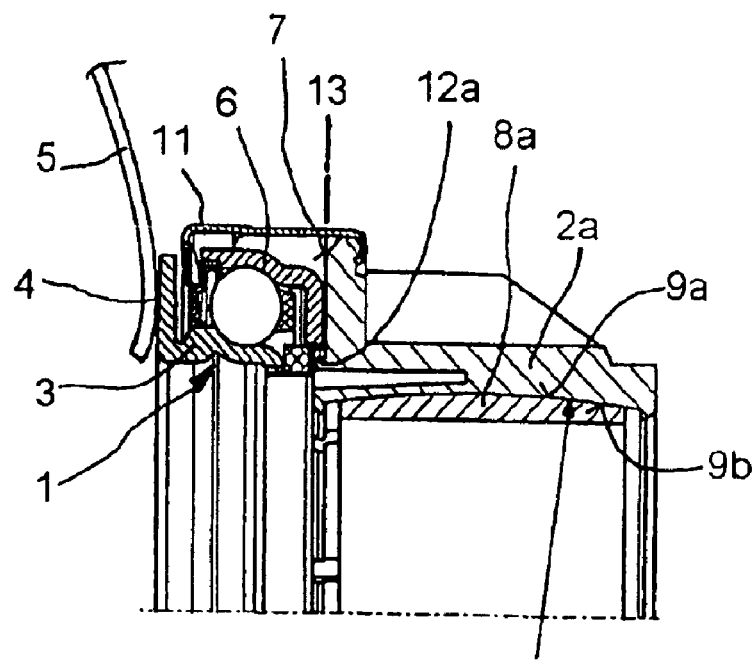
FIG. 1 is a view of a partial cross-section of a release mechanism with a sliding sleeve, which works together with a centering element by way of a common spherical surface and with an outer ring of a release bearing by way of a common sliding surface.

FIG. 1 is a view of a partial cross-section of a clutch release mechanism for actuating a friction clutch using a release spring 5. The release mechanism includes a release bearing 1, which is a ball bearing with an inner ring 3 and an outer ring 6. The inner ring 3 rests by its contact surface 4 against the tongues of the release spring 5. The outer ring 6 has a sliding surface 7 in common with a sliding sleeve 2a, which has a ring-shaped stop 12a for the outer ring 6 of the release bearing 1. The common sliding surface lies in a plane 13 transverse to the center axis of the release bearing 1. On its inside diameter, the sliding sleeve 2a has a spherical bearing surface in common with a centering element 8a. The centering element 8a preferably has a convex spherical surface 9a, and the sliding sleeve 2a preferably has a concave spherical surface 9b. Surfaces 9a and 9b have a common radius 10*a*. A clamp 11 connects the release bearing 1 to the sliding sleeve 2*a* so that they form a single structural unit.

Figure 2:
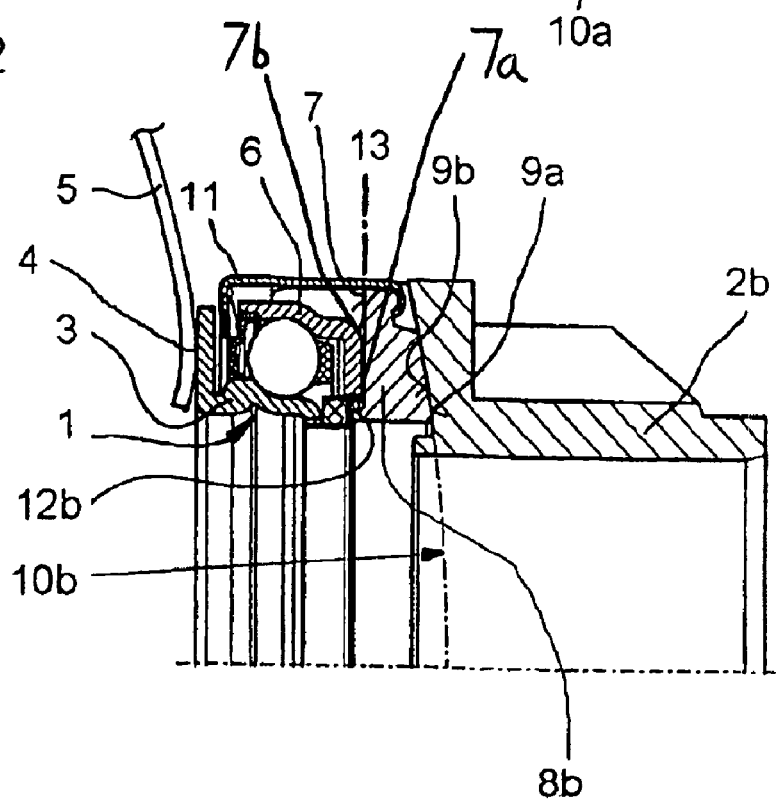
FIG. 2 is a view of a partial cross-section of a release mechanism with a centering element, one side of which carries the spherical bearing surface which works with the sliding sleeve, while the other side forms the sliding surface which works with the outer ring of the release bearing.

FIG. 2 is a view of a partial cross-section of a release mechanism with a centering element 8*b* between a sliding sleeve 2*b* and the release bearing 1. Centering element 8*b* is a ring with a convex spherical surface 9*a* on one side and with the sliding surface 7*a* on the opposite side. The concave spherical surface 9*b* corresponding to surface 9*a* is formed on an end surface of the sliding sleeve 2*b*. The surfaces 9*a* and 9*b* have a common radius 10*b*. A ring-shaped stop 12*b* is provided both on the sliding surface 7 and on the spherical bearing surface 9 to limit the deflections of the release bearing 1 with respect to the sliding sleeve 2*b*. A clamp 11 connects the release bearing 1 to the sliding sleeve 2*b* so that the two elements form a single structural unit.

Figure 3:
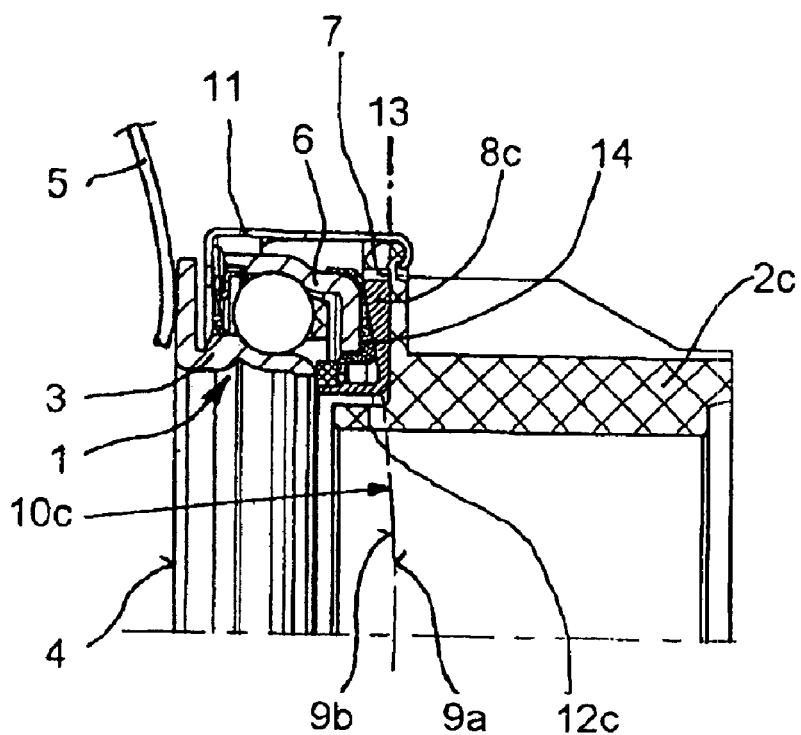
FIG. 3 is a view of a partial cross-section of an embodiment of a release mechanism with a centering element, which has a sliding surface in common with the sliding sleeve and a spherical bearing surface in common with a ring, which is mounted on the outer ring of the release bearing.

FIG. 3 illustrates the position of a centering element 8*c* between the outer ring 6 of the release bearing 1 and a sliding sleeve 2*c*. A profiled ring 14 is connected to the outer ring 6 of the release bearing 1. On the side facing away from the bearing 1, ring 14 has a convex spherical surface 9*a*. Surface 9*a* cooperates with concave spherical surface 9*b* on the adjacent side of the centering element 8*c*. The surfaces 9*a* and 9*b* have a common radius 10*c*. The other side of the centering element 8*c* has the sliding surface 7 in plane 13. A stop 12*c* is provided on sliding surface 7 to limit the deflection of release bearing 1 with respect to sliding sleeve 2*c*.

Figure 4:
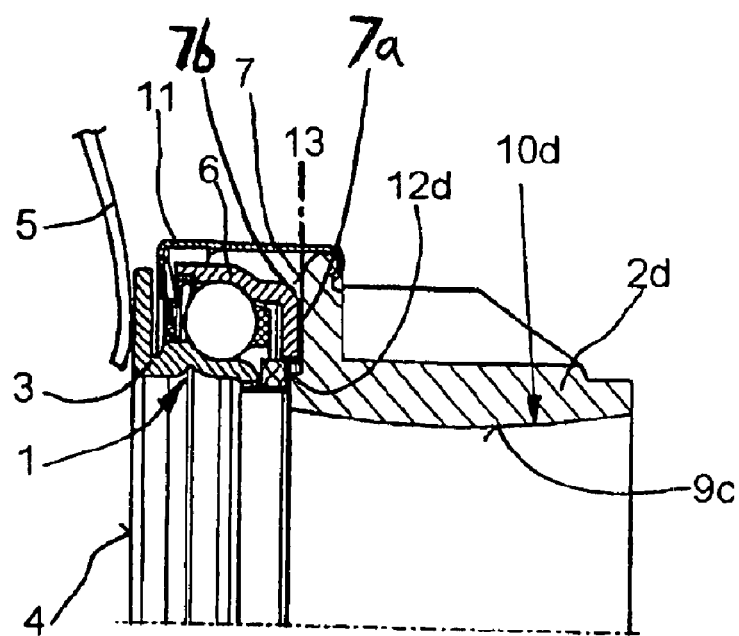
FIG. 4 is a view of a partial cross-section of an embodiment of a release mechanism without a centering element, where the sliding surface is between the outer ring and the sliding sleeve, which has a convex bearing point on the guide sleeve.

FIG. 4 shows that it is also possible for a release mechanism to react in a simple manner to the eccentric forces of the release bearing 1. Sliding sleeve 2*d* includes a radially inward facing convex spherical surface 9*c* which contacts the guide sleeve (not shown) with a radius 10*d*, which allows a limited wobbling movement of the release bearing 1. In plane 13, the end surface of the sliding sleeve 2*d* has a sliding surface 7*a* and a stop 12*d*. The sliding surface 7*a* cooperates with the sliding surface 7*b* of the outer ring 6 of the release bearing 1. The contact surface 4 of the inner ring 3 rests against the tongues of the release spring 5. A clamp 11 connects the release bearing 1 to the sliding sleeve 2*d* to form a single structural unit.

Figure 5:
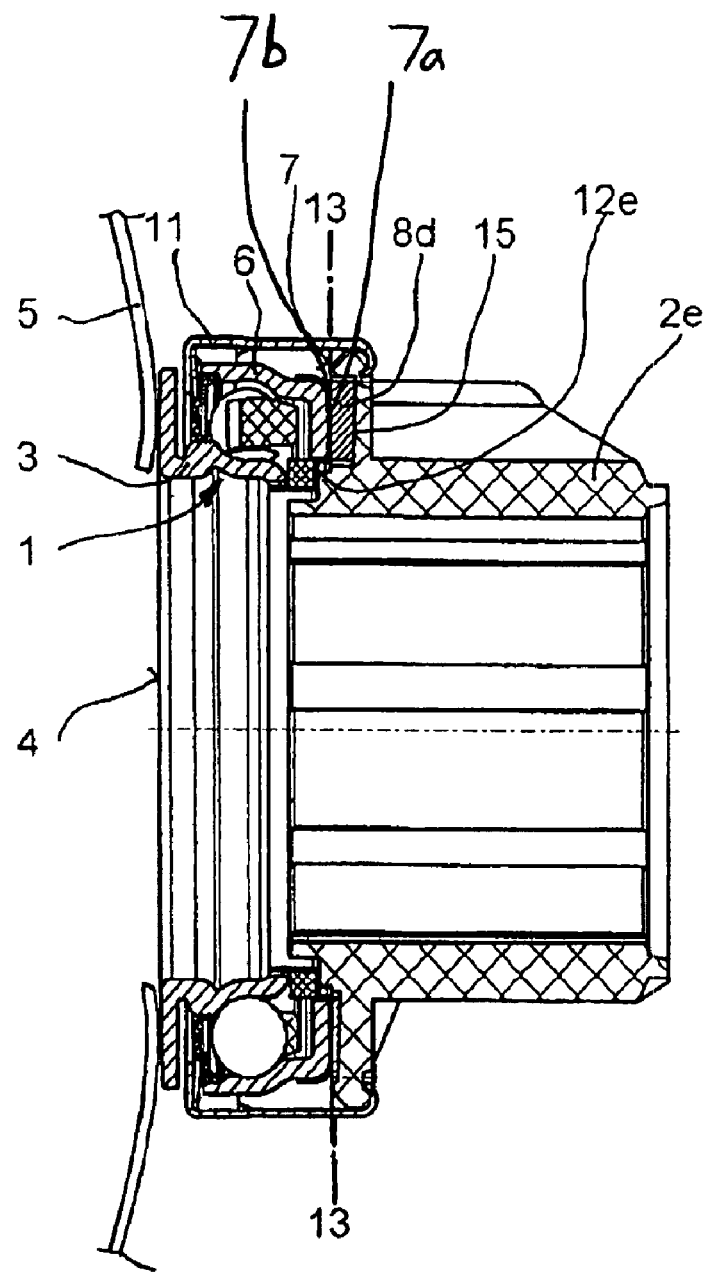
FIG. 5 is a view of a partial cross-section of an embodiment of a release mechanism with a centering element, which has a slanted surface in common with the sliding sleeve and the sliding surface in common with the outer ring.

FIG. 5 is a view of a partial cross-section of an embodiment of a release mechanism with a centering element 8*d* between the sliding sleeve 2*e* and the release bearing 1. Centering element 8*d* is designed as a ring and has a sliding surface 7*a* on one side and a slanted surface 15 on the other side. The slanted surface 15 works together with a complementary slanted surface on the end of the sliding sleeve 2*e*, against which the centering element 8*d* can turn to produce a wobble angle at the contact surface 4. The sliding surface 7*b* of the outer ring 6 rests on the sliding surface 7*a* of the centering element 8*d* along common plane 13. A stop 12*e* is provided on the sliding sleeve 2*d* to limit the deflection of the outer ring 6 of the release bearing 1 with respect to the sliding sleeve 2*e*. A clamp 11 connects the release bearing 1 to the sliding sleeve 2*e* to form a single structural unit.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A release mechanism for actuating a friction clutch between an internal combustion engine and a transmission of a motor vehicle, the release mechanism being designed for concentric assembly on a guide sleeve mounted on a transmission shaft in order to bear against a release spring of the friction clutch, the guide sleeve and the friction clutch each having a respective center axis, the release mechanism comprising:

a clutch release bearing comprising an inner ring, an outer ring, and a sliding sleeve connected with one of the inner ring and outer ring for axial movement with respect to the guide sleeve;

a first device for compensating for at least one of a tilt between the center axes and wobbling eccentricity of the release spring, said first device comprising a radially inward facing convex spherical surface on said sliding sleeve, said spherical surface contacting the guide sleeve; and a second device for compensating for offset between the center axes, the second device comprising a sliding surface disposed in a plane perpendicular to the center axis of the guide sleeve between the clutch release bearing and the sliding sleeve so that the release bearing can slide on the sliding surface out of a co-axial position with the center axis of the guide sleeve by a limited amount with respect to the sliding sleeve.

2. The release mechanism of claim 1, wherein said first device and said second device are disposed integrally in the release mechanism.

3. The release mechanism of claim 1, wherein the spherical surface, as seen in a plane containing the axis of said guide sleeve, is defined by a radius disposed in said plane.

4. The release mechanism of claim 1, wherein said sliding surface is provided on said sliding sleeve and contacts said release bearing.

5. The release mechanism of claim 1 wherein in the area of the second device a stop is provided near said spherical bearing surface and said sliding surface for limiting sliding movement of said release bearing with respect to said sliding sleeve.

6. A release mechanism for actuating a friction clutch between an internal combustion engine and a transmission of a motor vehicle, the release mechanism being designed for concentric assembly on a guide sleeve mounted on a transmission shaft in order to bear against a release spring of the friction clutch, the guide sleeve and the friction clutch each having a respective center axis, the release mechanism comprising:

a clutch release bearing comprising an inner ring, an outer ring, and a sliding sleeve connected with one of the inner ring and outer ring for axial movement with respect to the guide sleeve;

a first device for compensating for at least one of a tilt between the center axes and wobbling eccentricity of the release spring, said first device comprising a radially inward facing convex spherical surface between the release bearing and the guide sleeve; and a second device for compensating for offset between the center axes;

wherein the second device comprises a sliding surface disposed in a plane perpendicular to the center axis of the guide sleeve between the clutch release bearing and the sliding sleeve so that the release bearing can slide on the sliding surface out of a co-axial position with the center axis of the guide sleeve by a limited amount with respect to the sliding sleeve; and wherein said spherical surface is provided on said sliding sleeve and contacts said guide sleeve, said sliding surface being provided on said sliding sleeve and contacting said release bearing.

7. A release mechanism for actuating a friction clutch between an internal combustion engine and a transmission of a motor vehicle, the release mechanism being designed for concentric assembly on a guide sleeve mounted on a transmission shaft in order to bear against a release spring of the friction clutch, the guide sleeve and the friction clutch each having a respective center axis, the release mechanism comprising:

a clutch release bearing comprising an inner ring, an outer ring, and a sliding sleeve connected with one of the inner ring and outer ring for axial movement with respect to the guide sleeve;

a first device for compensating for at least one of a tilt between the center axes and wobbling eccentricity of the release spring, said first device comprising a profiled ring connected to said outer ring of said release bearing and having a convex spherical surface, and a centering element having a concave spherical surface received against said convex spherical surface; and a second device for compensating for offset between the center axes, said second device comprising a sliding surface on said centering element, said sliding surface being located in a plane perpendicular to the center axis of the guide sleeve and contacting said sliding sleeve.

* * * * *